United States Patent [19]

Lowey et al.

[11] 3,988,495

[45] Oct. 26, 1976

[54] REMOISTENING ADHESIVE COMPOSITION AND ADHESIVE SHEET

[75] Inventors: James F. Lowey, Fremont; Thomas V. Frommherz, Appleton, both of Wis.

[73] Assignee: Central Paper Company, Menasha, Wis.

[22] Filed: Apr. 17, 1975

[21] Appl. No.: 568,979

[52] U.S. Cl. .......................... 428/343; 260/17.4 ST; 428/355
[51] Int. Cl.² ........................ C08L 3/12; C09J 7/02
[58] Field of Search ............. 260/17.4 ST; 428/343, 428/358

[56] References Cited
UNITED STATES PATENTS

| | | | |
|---|---|---|---|
| 2,791,512 | 5/1957 | Hatch et al. | 106/208 |
| 2,838,421 | 6/1958 | Sohl | 428/355 |
| 2,866,772 | 12/1958 | Sellers | 428/355 |
| 2,997,404 | 8/1961 | Roberson et al. | 106/205 |
| 3,556,835 | 1/1971 | Sorell | 428/355 |
| 3,696,065 | 10/1972 | Hoffman | 260/17.4 |

*Primary Examiner*—Edward M. Woodberry
*Attorney, Agent, or Firm*—Brezina & Lund

[57] ABSTRACT

A remoistening adhesive composition based on high amylopectin, low amylose starch includes poly(vinyl methyl ether-maleic acid monoalkyl ester) in a preferred proportion of about 1.5–20% by weight of the composition, thereby providing improved quick tack and shorter bonding times. An adhesive sheet comprises a sheet of paper coated on one side thereof with the composition.

13 Claims, No Drawings

REMOISTENING ADHESIVE COMPOSITION AND ADHESIVE SHEET

This invention relates to remoistening adhesive compositions and to adhesive sheets. More particularly, the invention relates to improved remoistening adhesive compositions based on high amylopectin, low amylose starch and to adhesive sheets prepared therewith.

Remoistening adhesive compositions based on high amylopectin, low amylose starch are disclosed in U.S. Pat. Nos. 2,791,512 and 2,997,404. The adhesive compositions are useful for the manufacture of adhesive sheets including adhesive tape.

High speed packaging imposes requirements of high initial tack and relatively short bonding time for the utilization of remoistening adhesives on adhesive sheets, particularly, reinforced adhesive tapes. It would be advantageous if improvements in these properties could be achieved, over the results obtained with the prior compositions.

It has now been discovered in accordance with the invention that a remoistening adhesive composition based on high amylopectin, low amylose starch, having high initial tack coupled with significant decrease in the time necessary for the formation of a permanent bond, is provided by incorporating in the composition the polymer, poly(vinyl methyl ether-maleic acid monoalkyl ester), in a minor, effective amount.

The improvements of the invention are exhibited by a two-component system of the starch and the polymer. In practice, however, it is generally preferred to incorporate additives, as conventionally employed in such starch compositions, for contributing desirable properties and/or reducing costs. Such additives include viscosity-reducing agents, anticurling agents, and wetting, film-forming or tackifying agents.

Starches high in amylopectin and low in amylose are readily available, preferably being derived from the waxy maize strain of corn, and also from other sources. The preferred products contain up to about 10% amylose, by weight, and the balance substantially amylopectin, and available products contain from 2–10% amylose. Commercially available starch products suitable for use in the adhesive composition include "Amaizo" (American Maize Products Company), "Tapon" (National Starch and Chemical Corporation), "Sta-Tape" (A. E. Staley Manufacturing Company), and "Gum Tac" (Corn Products Corporation). The starch preferably is employed in a minimum proportion of about 60%, and in a proportion in a range of about 60' to 90%, in proportions by weight of the composition, on a solids or dry basis.

Poly(vinyl methyl ether-maleic acid monoalkyl ester) is a copolymer of the following structural formula, wherein R represents an alkyl radical and $n$ represents the number of repetitive units in the polymer:

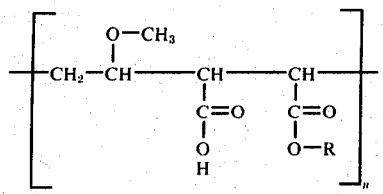

The lower alkyl esters are preferred, especially those in which the alkyl radical, R, has 1–4 carbon atoms. More preferably, the alkyl radical is methyl, ethyl, isopropyl, or n-butyl, and the specific viscosity of the polymer as determined on a solution of 1 gram thereof in 100 ml. of methanol at 25° C (determined with reference to methanol of 25° C) is approximately as follows:

| Alkyl Radical | Specific Viscosity |
|---|---|
| Methyl | 0.9–1.3 |
| Ethyl | 1.1–1.5 |
| Isopropyl | 1.3–1.7 |
| n-Butyl | 1.6–2.0 |

The polymer, poly(vinyl methyl ether-maleic acid monoalkyl ester), is employed in a minor amount effective to increase the initial tack and decrease the bonding time as compared to the composition in the absence of the polymer. The proportion may vary with the specific polymer and with variations in the ingredients of the adhesive composition. In general, the polymer is effective in a proportion of about 1.5–20%, preferably about 1.5–12.5%, in proportions by weight of the composition, on a solids or dry basis.

As in the case of the prior remoistening adhesive compositions, dextrin may be incorporated in the adhesive composition of the invention. Dextrin reduces viscosities and costs, and also performs a wetting function. White corn dextrin and canary dextrin are preferred. Suitable commercially available products include the "Globe" white corn and canary dextrins (Corn Products Corporation); and the "Nadex" white corn and canary dextrins (National Starch and Chemical Corporation). Dextrin may be employed in a proportion up to about 20%, preferably in the range of about 5–20%, in proportions by weight of the composition, on a solids basis. The dextrin may contain up to about 35% amylose by weight, and the foregoing products contain about 25–35% by weight of amylose and the balance substantially amylopectin. It is preferred to maintain the amylose content of the complete adhesive composition below about 30%, by weight, on a solids basis.

Anticurling agents as conventionally employed in the remoistening adhesive art may be included in the new adhesive composition. Such agents include sodium nitrate, urea, sorbitol, and others. An anticurling agent may be included in a proportion up to about 15%, preferably in the range of about 5–15%, by weight of the composition, on a solids basis.

Wetting, film-forming, or tackifying agents (generally referred to hereinafter as "wetting agents") as also conventionally employed in the remoistening adhesive art, serving to increase working or open times, likewise may be included in the new adhesive composition. Such agents include, for example, polyacrylamide, calcium chloride, zinc chloride, trisodium phosphate, and soap chips. Such a wetting agent may be included in a proportion up to about 5%, preferably in the range of about 0.5–5%, by weight of the composition on a solids basis.

The adhesive composition is provided in the form of an aqueous solution for coating purposes. The components are slurried in water, with the poly(vinyl methyl ether-maleic acid monoalkyl ester) dissolved in a polar solvent for incorporation in the solution. Sufficient water is incorporated in the solution to produce a coating solution viscosity preferably of about 250–3,000 centipoises at 80° C, corresponding to a solids content of about 35–60% by weight of the solution. Suitable solvents for the polymer include water-soluble alcohols, ketones and esters of boiling points lower than about 95° C, including methanol, ethanol, isopropanol, acetone, diethylene glycol, ethylene glycol monomethyl ether, tetrahydrofuran, ethyl acetate, butyl carbitol, butyrolacetone, methyl ethyl ketone, dioxane, and others. The aqueous composition is gelatinized at elevated temperature, coated on a suitable substrate, such as paper, and dried to about 5% maximum retained moisture, all following conventional procedures.

Adhesive sheets produced in the foregoing manner according to the invention, especially reinforced tapes, exhibit significantly higher initial tack generally accompanied by significant decrease in bonding time, as compared to the prior compositions. The improved results according to the invention are illustrated in the examples which follow. In the examples, the adhesiveness of gummed tape samples is measured using the McLaurin tack tester as in ASTM designation D-773-47. The adhesive is coated on 2-inch wide test strips of 60 pound basis kraft paper at a coating weight of 14 pounds per 3,000 square feet. Bonding times are determined after 5 seconds of open time following moistening, as the measure of time in seconds for the moistened adhesive strip which has been laminated to a standard No. 200 corrugate substrate to pull paper fibers from the substrate when pulled back upon itself. Times are measured to initial fiber tear and to full fiber tear.

The following examples illustrate the preparation of adhesive compositions containing the polymer, poly(vinyl methyl ether-maleic acid monoalkyl ester) according to the invention, and the improved results obtained therewith, as compared to adhesive compositions not containing the polymer. It will be understood that the invention is not limited to the examples, which are merely illustrative, or to the materials, proportions, conditions and procedures set forth therein. In the examples, the proportions are by weight.

EXAMPLE 1

In the manufacture of an adhesive solution for coating purposes according to the invention, 4.6 parts white corn dextrin ("Globe Dextrine"). 1.4 parts of polyacrylamide ("Cyanamer P-26", mol. wt. 200,000, American Cyanamid Company), and 46 parts of water are slurried for 5 minutes. The dextrin contains approximately 27% amylose and 73% amylopectin.

To the slurry is added 56 parts of corn starch (Tapon) containing 6% of amylose and the balance substantially amylopectin. The temperature is raised to 70° C, and 1.4 parts of poly(vinyl methyl ether-maleic acid mono-n-butyl ester) (specific viscosity 1.8, "Gantrez Es", G.A.F. Corporation) in 50% solution in methanol is added and mixed for 5 minutes.

The slurry then is heated to 95° C and gelatinized by cooling at that temperature for 15 minutes, during which time, the methanol solvent for the polymer is substantially distilled off. Anhydrous calcium chloride, 0.7 parts, is added with mixing, to complete the preparation of the adhesive coating solution. The solution contains 54% solids and has a viscosity of 800 centipoises at 80° C. It has the following composition, in percentages by weight, on a solids or dry basis:

| Material | Proportion, % |
| --- | --- |
| Starch | 85.0 |
| Dextrin | 8.5 |
| Polyacrylamide | 2.6 |
| Poly(vinyl methyl ether-maleic acid mono-n-butyl ester) | 2.6 |
| Calcium chloride | 1.3 |

The adhesive solution is coated on paper sheets or strips in the conventional manner and dried to about 5% maximum retained moisture.

Gummed tape samples tested on the McLaurin tack tester exhibit adhesivity values of about 65. Bonding times with 5 seconds open time are: Initial fiber tear, 8 seconds; full fiber tear, 13 seconds.

The monomethyl, monoethyl, or monoisopropyl ester of poly(vinyl methyl ether-maleic acid) may be substituted for the monobutyl ester thereof in the above composition, in the same proportion.

A composition formulated in the same manner and from the same materials as and comparable to the above composition but containing no ester of poly(vinyl methyl ether-maleic acid) includes the following materials, in percentages by weight, on a solids basis:

| Material | Proportion, % |
| --- | --- |
| Starch | 87.3 |
| Dextrin | 8.8 |
| Polyacrylamide | 2.6 |
| Calcium chloride | 1.3 |

Gummed tape samples tested on the McLaurin tack tester exhibit adhesivity values of about 32. Bonding times with 5 seconds open time are: Initial fiber tear, 15 seconds; full fiber tear, 22 seconds.

Another preferred composition according to the invention has the following composition, employing the same materials as in the first-described composition:

| Material | Proportion, % |
| --- | --- |
| Starch | 85.0 |
| Dextrin | 8.5 |
| Polyacrylamide | 2.5 |
| Poly(vinyl methyl ether-maleic acid mono-n-butyl ester) | 2.5 |
| Calcium chloride | 1.5 |

EXAMPLE 2

The following compositions are formulated with water, heated and gelatinized in the manner of Example 1, to provide adhesive solutions containing 38% solids:

| Material | Proportion, % |
| --- | --- |
| Composition A | |
| Starch ("Tapon") | 83.2 |
| Sodium nitrate | 12.3 |
| Polyacrylamide (M.W. 200,000) | 4.5 |
| Composition B | |
| Starch ("Tapon") | 83.2 |
| Sodium nitrate | 12.3 |
| Polyacrylamide (M.W. 200,000) | 2.25 |
| Poly(vinyl methyl ether-maleic acid mono-n-butyl ester) | |

-continued

| Material | Proportion, % |
|---|---|
| (sp. vis. 1.8), 50 % in methanol | 2.25 |
| Composition C | |
| Starch ("Tapon") | 79.1 |
| Sodium nitrate | 12.4 |
| Polyacrylamide (M.W. 200,000) | 2.2 |
| Poly(vinyl methyl ether-maleic acid mono-n-butyl ester) (sp. vis. 1.8), 50 % in methanol | 6.3 |

Compositions D, E, and F are the same as Composition B, with the substitution, respectively, of the monomethyl ester (sp. vis. 1.1), the monoethyl ester (sp. vis. 1.3), and the monoisopropyl ester (sp. vis. 1.5) of poly(vinyl methyl ether-maleic acid) for the butyl ester thereof. Each of the esters is incorporated in the adhesive solution as a 50% solution in methanol.

The McLaurin adhesivities and bonding times with 5 seconds open time, including initial fiber tear and full fiber tear, obtained with the compositions are set forth in the following table:

| Composition | Adhesivity | Initial Tear, secs. | Full Tear, secs. |
|---|---|---|---|
| A | 28 | 15 | 20 |
| B | 60 | 8 | 10 |
| C | 68 | 7 | 12 |
| D | 45 | 14 | 19 |
| E | 50 | 11 | 17 |
| F | 40 | 6 | 8 |

EXAMPLE 3

The following adhesive compositions are formulated with water, heated and gelatinized, generally in the manner of Example 1, to provide adhesive solutions containing 40% solids:

| Material | Proportion, % |
|---|---|
| Composition G | |
| Starch ("Tapon") | 92.5 |
| Sodium nitrate | 7.5 |
| Composition H | |
| Starch ("Tapon") | 87.5 |
| Sodium nitrate | 7.5 |
| Poly(vinyl methyl ether-maleic acid mono-n-butyl ester) | 5.0 |

The McLaurin adhesivities and bonding times with 5 seconds open time, including initial fiber tear and full fiber tear, obtained with the compositions are set forth in the following table:

| Composition | Adhesivity | Initial Tear, secs. | Full Tear, secs. |
|---|---|---|---|
| G | 30 | 17 | 22 |
| H | 60 | 11 | 15 |

We claim:

1. In a remoistening adhesive composition based on high amylopectin, low amylose starch, the improved combination with poly(vinyl methyl ether-maleic acid monoalkyl ester), in a minor amount effective to increase the initial tack and decrease the bonding time of the composition.

2. A composition as defined in claim 1 and wherein said polymer is present in a proportion of about 1.5–20% by weight of the composition, on a solids basis.

3. A composition as defined in claim 2 and wherein said alkyl radical has 1–4 carbon atoms.

4. A composition as defined in claim 2 wherein said alkyl radical is methyl, ethyl, isopropyl, or n-butyl, and the specific viscosity of said polymer as determined on a solution of 1 gram thereof in 100 ml. of methanol at 25° C is approximately as follows:

| Alkyl Radical | Specific Viscosity |
|---|---|
| Methyl | 0.9–1.3 |
| Ethyl | 1.1–1.5 |
| Isopropyl | 1.3–1.7 |
| n-Butyl | 1.6–2.0 |

5. A composition as defined in claim 1 and wherein said starch is present in a minimum proportion of about 60% by weight of the composition, on a solids basis.

6. A composition as defined in claim 5 and wherein said starch contains up to about 10% amylose by weight and the balance substantially amylopectin.

7. A composition as defined in claim 6 and wherein the amylose content of the composition is below about 30% by weight, on a solids basis.

8. A remoistening adhesive composition which comprises, in approximate percentages by weight:

| | |
|---|---|
| Dextrin | up to 20 % |
| Anticurling agent | up to 15 % |
| Wetting agent | up to 5 % |
| Poly(vinyl methyl ether-maleic acid monoalkyl ester) | 1.5 to 20 % |
| Starch | Balance | said dextrin being white corn dextrin or canary dextrin containing up to about 35% amylose by weight, said alkyl radical having 1–4 carbon atoms, and said starch containing up to about 10% amylose by weight and the balance substantially amylopectin, the minimum proportion of said starch being about 60% by weight.

9. A composition as defined in claim 8 and wherein said alkyl radical is methyl, ethyl, isopropyl, or n-butyl, and the specific viscosity of said polymer as determined on a solution of 1 gram thereof in 100 ml. of methanol at 25° C is approximately as follows:

| Alkyl Radical | Specific Viscosity |
|---|---|
| Methyl | 0.9–1.3 |
| Ethyl | 1.1–1.5 |
| Isopropyl | 1.3–1.7 |
| n-Butyl | 1.6–2.0 |

10. A composition as defined in claim 9 and containing about 5–20% dextrin, about 5–15% anticurling agent, and about 0.5–5% wetting agent, in percentages by weight.

11. A remoistening adhesive composition which comprises, in approximate percentges by weight:

| | |
|---|---|
| White corn dextrin | 8.5 % |
| Polyacrylamide | 2.5–2.6 % |

-continued

| | |
|---|---|
| Calcium chloride | 1.3–1.5 % |
| Poly(vinyl methyl ether-maleic acid n-butyl ester) | 2.5–2.6 % |
| Starch | 85.0 % | said dextrin containing about 25–35% amylose by weight, said starch containing up to about 10% amylose and the balance substantially amylopectin, and said poly (vinyl methyl ether-maleic acid n-butyl ester) having a specific viscosity of about 1.6–2.0 as determined on a solution of 1 gram thereof in 100 ml. of methanol at 25° C.

12. An adhesive sheet which comprises a sheet of paper coated on one side thereof with a composition as defined in claim 1.

13. An adhesive tape which comprises a flexible elongated paper strip coated on one side thereof with a composition as defined in claim 1.

* * * * *